March 24, 1931.　　H. BILGRAM ET AL　　1,798,059
MACHINE FOR MAKING ROTORS
Original Filed July 8, 1922　　4 Sheets-Sheet 2
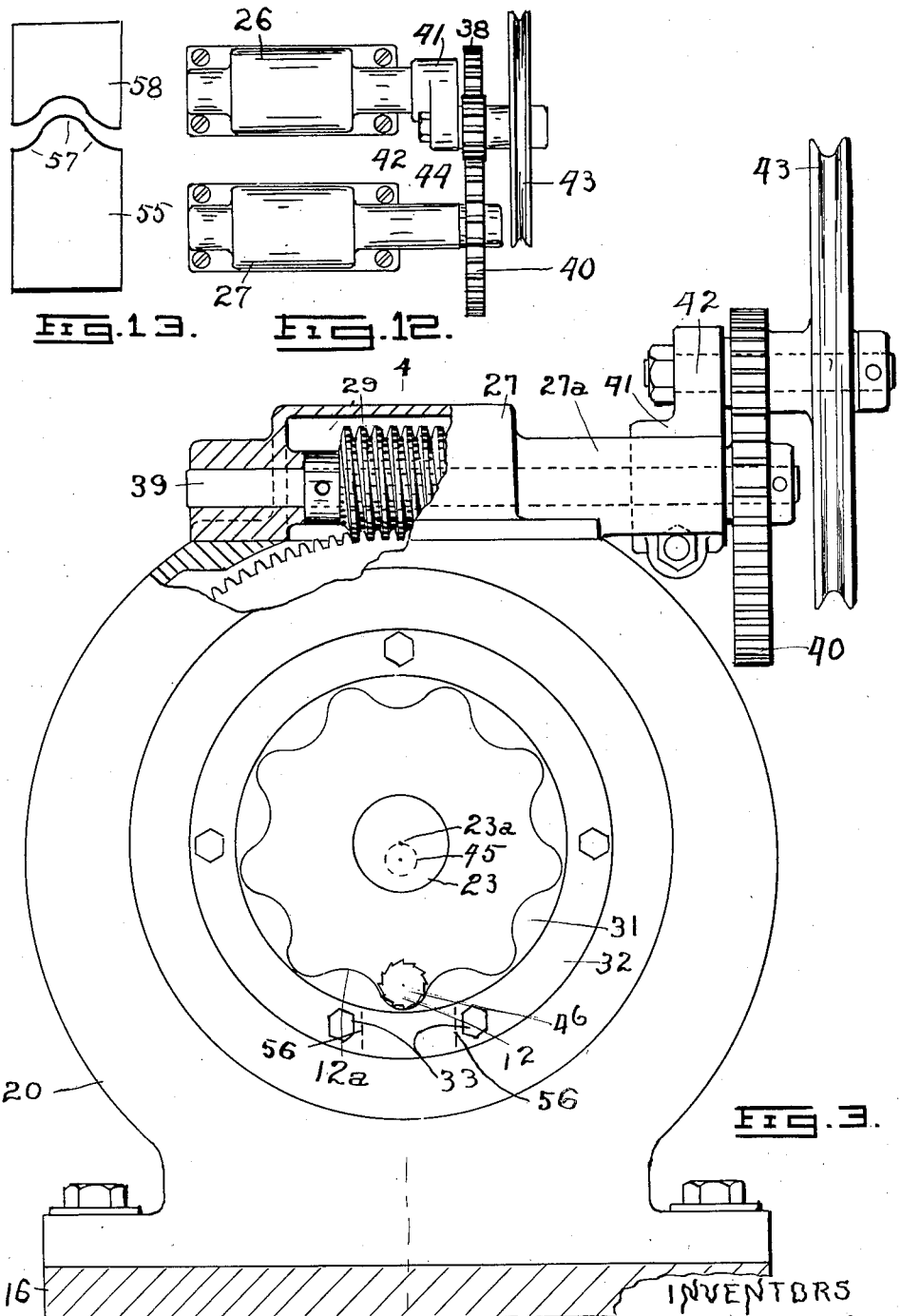

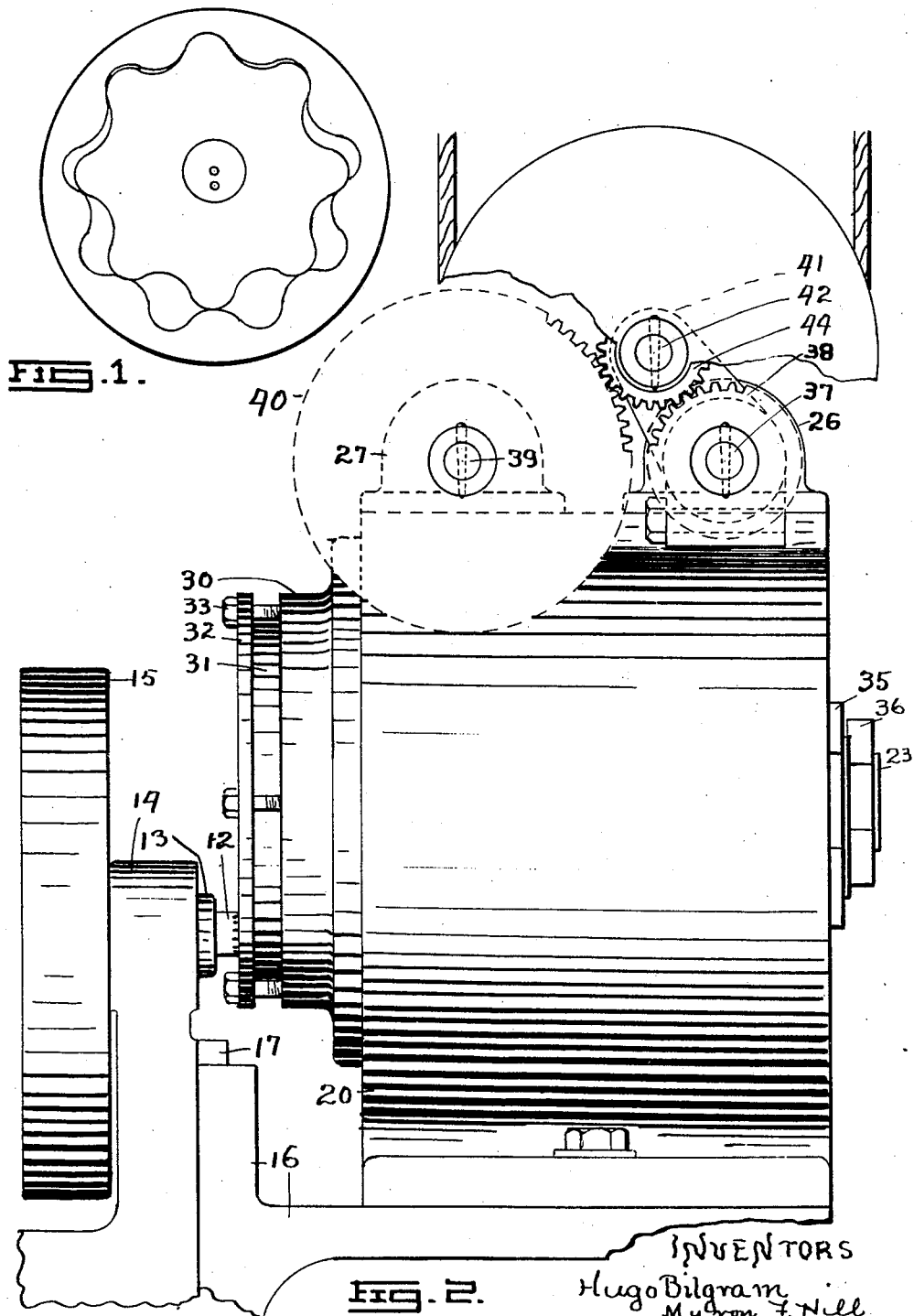

March 24, 1931. H. BILGRAM ET AL 1,798,059
MACHINE FOR MAKING ROTORS
Original Filed July 8, 1922 4 Sheets-Sheet 3
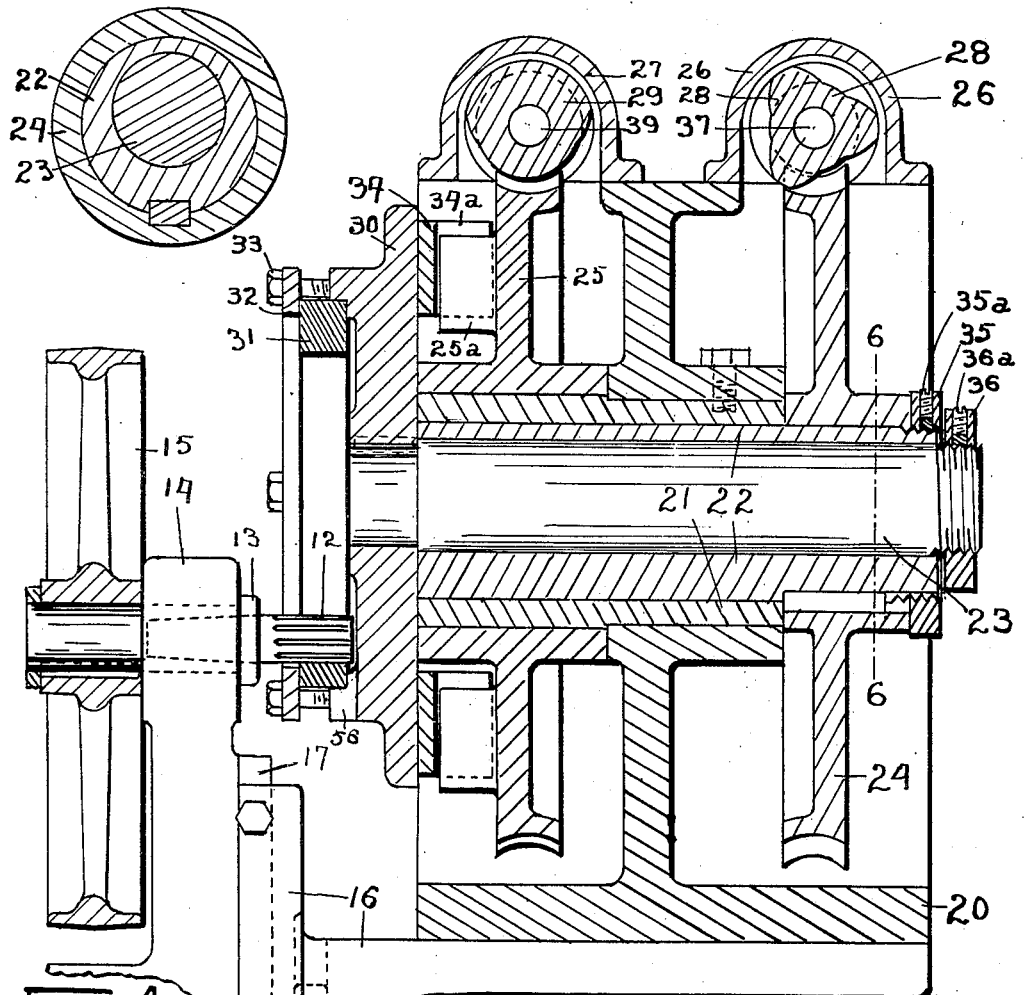
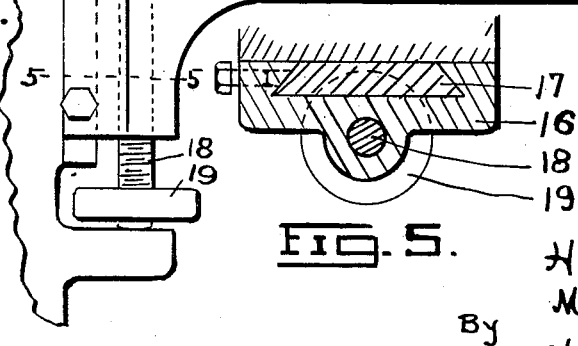
INVENTORS
Hugo Bilgram
Myron F. Hill
By Myron F. Hill
ATTY

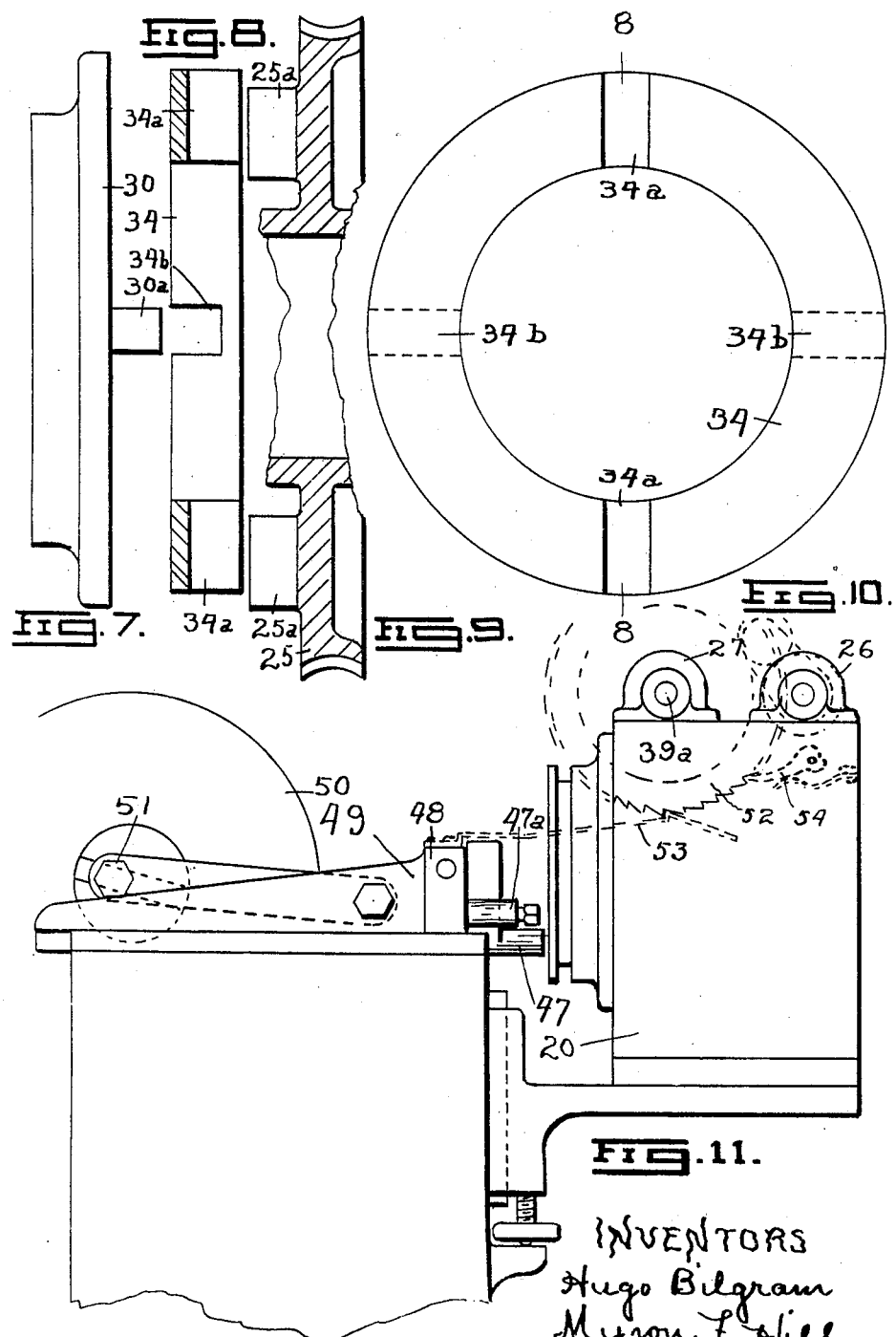

Patented Mar. 24, 1931

1,798,059

UNITED STATES PATENT OFFICE

HUGO BILGRAM, OF MOYLAN, PENNSYLVANIA, AND MYRON F. HILL, OF BRIDGEPORT, CONNECTICUT, ASSIGNORS TO HILL ENGINEERING CO., INC., A CORPORATION OF NEW YORK

MACHINE FOR MAKING ROTORS

Application filed July 8, 1922, Serial No. 573,559. Renewed October 27, 1927.

Our invention relates to gears or rotors of a peculiar character, and to a machine for outlining their contours. The rotors are of a mutually generative type, one rotating within the other, each having teeth, with the teeth of one continuously in contact with teeth of the other and making proper driving contact therewith in the region of full mesh over a distance equal to at least a tooth division.

Our invention relates particularly to a machine for forming such mutually generated teeth, upon one or both rotor members. It includes arriving at a form and dimensions of the curvature of one such rotor and from it making the other rotor, either by the manufacture of the other rotors from such form and dimensions or from tools made for or from such rotor form and dimensions. It includes a machine with a cutting tool arrangement on it with a size and form so related to a tooth of one such rotor that, during the operation of the machine it cuts the teeth of the other rotor, or cuts tools useful in arriving at the form and size of the other rotor.

The process and mechanism shown herein includes the use of a tool having the size and form that has the outlining effect of a wheel tooth such for example as a shaper tool or a circular milling cutter of a milling machine, and the process of generation consists in imparting to the machine such a movement as will result in the production of a curve of a circroidal (see Kinematics of Gerotors by M. F. Hill, on file in the Patent Office library) or generated nature on a blank suitable for machining.

Figure 1 shows a pair of rotors.

Figure 2 is a side elevation of one form of our machine.

Figure 3 is a front elevation of Figure 2.

Figure 4 is a section on line 4—4 Figure 3.

Figure 5 is a section on line 5—5 of Figure 4.

Figure 6 is a section on line 6—6 of Figure 4.

Figure 7 is a side elevation of the blank holder.

Figure 8 is a section on line 8—8 Fig. 10.

Figure 9 is a section of one of the worm gears, parts being broken away.

Figure 10 is a face view of Figure 8.

Figure 11 is a side view of a modification.

Figure 12 is a plan view, reduced size, of the worm housings and spur gears shown in Figs. 2 and 3, and 4.

Figure 13 is a blank for a tool.

In one form of our machine, a cutting tool or milling cutter 12 (Figs. 2 and 4), may be held in the arbor 13 of a suitable milling machine 14, rotated in the usual way or by a belt pulley 15. On the body of the milling machine may be supported a knee or table 16 adapted by means of the vertical slide way 17 and the adjustment screw 18, provided with the hand wheel 19, to be raised or lowered. It is apparent that by raising and lowering the table 16 upon which the generating fixture rests, the distance between the axis of the milling cutter or other tool, and the axes of the two generating shafts is varied. This determines of course the diameter of the rotor curve being generated. Upon the table 16 may rest the generating device or fixture which may be described as follows:

The body or housing 20 of this fixture, provided with the sleeve 21, carries the main arbor 22, which is bored out eccentrically, and in turn carries the chuck arbor 23. To the rear of the said main arbor 22 is secured the worm wheel 24, which, when the annular wheel of an eight by nine tooth movement is to be generated, is provided with one hundred and fifty teeth.

Upon the sleeve 21 is carried also, free to rotate thereon, the worm wheel 25, having two hundred teeth.

Secured to the upper face of the housing 20 are two worm housings 26 and 27, carrying the worms 28 and 29. The worm 28 is triple and meshes with the worm wheel 24, so that its ratio is fifty to one. The worm 29 is single and meshes with the worm wheel 25, its ratio of gearing being two hundred to one.

The chuck arbor 23 carries on its front end the chuck or work holder 30 to which is clamped the annular rotor blank 31 that is to be cut. The clamping is effected thru the clamp ring 32 and the clamp bolts 33. Between the rear face of the chuck 30 and the front face of the worm wheel 25 is located the carrier 34, (Figs. 4, 8 and 10) which consists of a metal ring provided with two diametral grooves 34a and 34b cut into it at right angles and from opposite sides. The worm wheel 25 is provided with two radial ribs 25a fitting into one pair of the diametral grooves 34a of the carrier and shown in a vertical position in the drawing. Two similar ribs 30a are attached to the rear face of the chuck 30 which fit into the other pair of the diametral grooves 34b of the carrier. They are shown in a horizontal position in the drawing.

The nuts 35 and 36 are fitted to the threaded ends of the arbors 22 and 23 and have the object of taking up the lost end motion of these shafts. Through the set screws 35a and 36a these nuts are prevented from turning when once adjusted.

The worm 28 is mounted upon the worm shaft 37 which carries on its front end the spur wheel 38 provided with twenty-eight teeth. Similarly, the worm 25 is mounted upon the worm shaft 39 that carries on its front end the spur wheel 40 provided with sixty-three teeth.

To the hub 26a of the worm housing 26 is clamped the stud holder 41, that carries the stud 42 upon which is free to rotate a compounded rope pulley 43 and twenty tooth spur gear 44. This latter spur gear meshes with the spur wheels 38 and 40 secured to the worm shafts as previously described.

The operation of the device may be described as follows:

The ratio of motion transmitted from the rope pulley 43 to the two worm wheels is such that the worm wheel 24 will make nine revolutions by the time worm wheel 25 completes one revolution. The carrier 34 connects the chuck 30 with the worm wheel 25 in such a way that the angular rotation of this worm wheel is transmitted to the chuck 30 altho their centers do not coincide. A rotary motion is therefore imparted to the chuck 30 corresponding with the rotation of the slow running worm wheel 25.

As the rapidly moving worm wheel 24 is attached to the main arbor 22, its only effect is to carry the axis 23a of the chuck arbor 23 in the circular path 45 (Fig. 3), while the rotation of this member 23 on its axis is governed entirely by the motion of the worm wheel 25 as above described. The motion of the chuck is thus of a peculiar compounded nature. Viewing the chucked blank 31 (Fig. 3) it slowly rotates bodily while its axis partakes of a comparatively rapid circular motion in the planetary path indicated by the circle 45.

A fixed point located in the axis or center 46 of the milling cutter 12, held against the face of the blank, moving as just described, will mark on this face a curve of a hypocircroidal (see Kinematics, supra) nature. Hence if both the milling machine pulley 15 and the rope pulley 43 are set in motion simultaneously, the cutter 12 will cut a path 12a in the blank which has the desired form. It is of course obvious that the inner rotor should fit the outer rotor as indicated in Fig. 1, the teeth of the inner or pinion rotor just touching or clearing the teeth of the outer rotor.

When this fit is attained between the rotors in any one position it exists in every possible position due to their being made or generated as described herein. One rotor assumes this relation to the other as a necessity from the operation of the machine.

The closer the shafts of the generating fixture are to each other and to their journal, the less aberration there is from the theoretical curves for rotors that may be sought. If the rotors are stiff in their relative rotation when first made a little running frees them up as well as burnishes their faces.

Such rotors are useful in pumps for air and liquids and for engines of many kinds, including air, steam and internal combustion types.

The design of the device may be varied. We do not confine ourselves to the numbers of teeth on the several wheels adapted to the machine for the gears described, nor to the ratio at which the worm wheels 24 and 25 are moved as long as they move with a relative ratio of some whole number to one. Nor is it essential that the tool with which the curves are generated, be of the nature of a rotary milling cutter. This may be replaced by a tool having a reciprocating movement, as that of a shaping machine or any other outlining tool. The shaping modification is indicated in Fig. 11, which may correspond in every respect with the machine shown in Fig. 4, with the difference that the tool is moved in the same manner in which the tool of a shaping machine is operated.

In this modification the tool 47, having a circular nose in the case shown, is secured by tool clamps 47a to the apron or tool post 48 of the ram 49 of the shaper, the driving pulley 50, which carries the crank 51, imparting a reciprocating motion to the ram 49. In every other respect the description of the device applies to the other parts of the machine. The ratchet wheel 52 on the worm shaft 39a, the pawl 53 on the ram 49, and the detent 54 secure an intermittent feed of the blank.

This invention is not confined to a tool of circular section, as a tool of any other form may be substituted for the tool shown, that will produce the curve of teeth of one of a pair of mutually generative wheels having suitable driving contacts.

Nor is it confined to generating the circroidal (see Kinematics of Gerotors by M. F. Hill, on file in the Patent Office library) curves by shifting the blank with a cutter in a fixed position. Reversals are possible, with the blank stationary, and the cutter and the drive therefor in the fixture. Or the blank may be operated by one worm, and the tool carried around by the other worm. All such variations lie within the scope of this invention.

Our machine may be employed to generate cutting tools for ordinary shaping, milling, or broaching operations, or that may be used to generate master tools for such operations. These and many other features lie within the broad scope of this invention, the main object of which is to generate the curves, or one of them, of mutually generative rotors, one within the other the teeth of one meshing in continuous contact at steady angular speeds with the teeth of the other for the length of a tooth division in the full mesh region.

How a tooth form, preferably circular of the pinion, has been selected, and the teeth and tooth spaces of the annular member generated therefrom, has been described.

Our invention may be employed for forming the tooth spaces of the pinion rotor. These in theory should be generated from the teeth of the annular and should be accurate, to preserve contact at full mesh, and prevent leakage from one side, useful for high pressure, to the other side, useful for low pressure.

The curvature of the pinion tooth space is generated from the tooth form of an annular rotor.

In place of a blank 31, a tool steel blank 55 (Fig. 13) may be secured in a slot in the chuck 30, indicated at 56, and the curve 57, the same as on the annular, generated thereon. This tool is then hardened and secured again in slot 56 and another tool blank 58, secured in the shaper (Fig. 13) is generated therefrom, much as the curves of the annular rotor are formed. A number of the latter tools 58 may be secured in a milling hob to mill the pinions with, travelling parallel to the pinion axis, the pinion blank being accurately indexed between cuts.

Modification of our machine to alter portions of the curves for various purposes is also possible without departing from the salient features of our invention.

What we claim is:

1. A machine for cutting tooth curves of rotors, one within the other, eccentric to it and having one less tooth, comprising a forming tool having the shape and location with relation to a blank held by a blank holder of the convex portion of a tooth of one of said rotors, means to operate it at forming speed on a fixed axis, and the blank holder, said blank holder comprising two members cooperating to rotate the blank on its axis and said axis around another axis; whereby said tool, having an in and out movement with relation to said blank holder, generates on said blank rotor curves to cooperate continuously in contact with said convex portion of a tooth.

2. The combination claimed in claim 1 having a circular forming tool.

3. The combination claimed in claim 1 having a circular forming tool representing the tooth of the inner rotor.

4. In a machine for describing rotor contours, two shafts, one within and eccentric to the other, means to rotate said shafts at different speeds differing by one, an outlining tool holder and a blank holder, means to operate one with relation to the other for forming a rotor curve; one connected to move with one of said shafts, and the other fixed with relation to the axis of the other of said shafts.

5. The combination claimed in claim 4, having worm driving means to drive the shafts and said means to rotate including gearing to said worm driving means.

6. The combination claimed in claim 4 having an independent intermediate member engaging the inner shaft in its successive eccentric rotating positions, and means connecting said intermediate member to the said means to rotate said shafts.

7. In a machine for outlining rotor contours, a driving device, ratio gears driven thereby, worms driven by said ratio gears, worm gears driven by said worms, a shaft driven by each worm gear, one shaft eccentric to the other, and blank holders and rotor contour outlining devices therefor operated to generate rotor contours on said blank, whereby errors in gear teeth are minimized by said worm drives.

8. The combination claimed in claim 7 having an intermediate gear to cause said shafts to rotate in the same direction for hypocircroidal curves.

9. The combination claimed in claim 7 having an intermediate steady angular velocity driving member between one of said shafts and its worm gear.

10. A machine for outlining gear or rotor curves of rotors, one within and eccentric to the other, comprising an outlining tool having the shape and location with relation to a blank held by a blank holder to be outlined, of the convex portion of a tooth of one of said rotors, gearing means to cause it to outline rotor curves on said blank for the other rotor, comprising two rotary members on eccentric axes with relation to said outlining tool causing it to outline curves on said blank to cooperate in continuous contact with said convex curve of said tooth.

11. A machine for outlining gear or rotor curves of rotors, one within and eccentric to the other, comprising a substantially circular outlining tool having the shape and location with relation to a blank held by a blank holder to be outlined, of the convex portion of a tooth of one of said rotors, means to cause it to outline rotor curves on said blank for the other rotor, comprising two rotary members on eccentric axes with relation to said outlining tool causing it to outline curves on said blank to cooperate in continuous contact with said convex curve of said tooth.

In testimony whereof we affix our signatures.

HUGO BILGRAM.
MYRON F. HILL.